United States Patent [19]
Mensing et al.

[11] 3,743,095
[45] July 3, 1973

[54] VORTEX FLOW SYSTEM FOR SEPARATING OIL FROM AN OIL-WATER MIXTURE

[75] Inventors: Arthur E. Mensing, East Hartford; James W. Clark, Glastonbury; Richard C. Stoeffler, Tolland, all of Conn.

[73] Assignee: United Aircraft Corporation, East Hartford, Conn.

[22] Filed: Apr. 20, 1972

[21] Appl. No.: 246,032

Related U.S. Application Data
[63] Continuation of Ser. No. 125,232, March 17, 1971, abandoned.

[52] U.S. Cl............... 210/84, 210/86, 210/96, 210/512, 210/DIG. 21
[51] Int. Cl............................................ B01d 21/26
[58] Field of Search.................. 210/84, 96, 304, 210/512, DIG. 21, 137, 86; 55/426, 427, 459

[56] References Cited
UNITED STATES PATENTS
3,215,272  11/1965  Sweeney............................ 210/84
3,481,118  12/1969  Willis et al....................... 210/512 X

FOREIGN PATENTS OR APPLICATIONS
996,826  12/1951  France........................... 210/512

*Primary Examiner*—Samih N. Zaharna
*Assistant Examiner*—F. F. Calvetti
*Attorney*—Donald F. Bradley

[57] ABSTRACT

A vortex separator is used to separate oil from an oil-water mixture which results, for example, from oil spills on a body of water. The separated oil may be stored or otherwise disposed of, while the separated water may be returned to the original body of water. The flow rate of the separated oil through the oil exit port of the vortex separator may be varied by using a movable tapered plug to change the area of the oil exit port. The area may be varied manually, or automatically in response to measurements of the oil content.

15 Claims, 9 Drawing Figures

PATENTED JUL 3 1973  3,743,095

INVENTORS
ARTHUR E. MENSING
JAMES W. CLARK
RICHARD C. STOEFFLER
BY Donald J. Bradley
ATTORNEY

VORTEX FLOW SYSTEM FOR SEPARATING OIL FROM AN OIL-WATER MIXTURE

This is a continuation of application Ser. No. 125,232, filed Mar. 17, 1971, now abandoned.

BACKGROUND OF THE INVENTION

1. Field of the Invention

This invention relates to improvements in vortex separators for general use in separating mixtures of two immiscible liquids having slightly different densities. More specifically, it pertains to vortex separators for use in separating oil from water at oil spills in rivers, bays and in the open ocean.

The desirability of improved systems and apparatus for cleaning up oil spills from a body of water is self-evident. Rapid deployment of the system once the spill is discovered is a prime factor in such a system. Consequently, systems capable of being transported by helicopter and/or by high speed boat are quite desirable.

Improvements in vortex separators for use in separating oil from an oil-water mixture make a system containing a vortex separator quite attractive for high speed deployment. A system that could be used to clean up oil spills would employ; first, a skimmer or scoop device for removing a mixture of oil and water from the surface; second, a high capacity pump; third, one or more vortex separators; fourth, a tank for temporary storage of recovered oil such as tanks in a ship, a flexible underwater tank of rubber or plastic, etc; and fifth, exhuast nozzles for returning water with a greatly reduced amount of oil to the body of water from which it was removed.

The improved vortex separator of this invention could also be used for other applications in which oil or a similar substance must be separated from water, such as for cleaning ballast water on tanker ships prior to discharge of the ballast water overboard, for removing oil from the wash water when oil storage tanks are cleaned, and for removing impurities such as soluble salts from fuels by a washing process in which water is added to the fuel to dissolve the salts, and the fuel is then separated from the wash water.

2. Description of the Prior Art

It is well known in the prior art that substances of different viscosities or densities may be separated by means of a vortex separator. Oil skimming apparatus for removing oil films from the surface of large bodies of water using a floating vessel with booms attached thereto for collecting the water-oil mixture and apparatus for separating the oil-water mixture is shown in U.S. Pat. No. 3,348,690.

The prior art, however, does not teach one skilled in the art the details of the vortex separator which are required to insure efficient separation of oil from an oil-water mixture. An efficient vortex separator as taught herein, coupled with oil content sensors which automatically provide for control of the flow through the vortex separator, produce much more efficient operation than provided by the prior art teachings.

In a preferred embodiment of this invention, core plates are provided within the vortex separator to enhance its operation and to maintain complete separation of the oil from the water.

As a result of the improvements in the vortex separator and its associated equipment as taught herein, a highly sophisticated shipboard or airborne system may be designed for easy maneuverability and rapid deployment when an oil spill occurs.

SUMMARY OF THE INVENTION

In accordance with the present invention, there is provided a high length-to-diameter ratio, axial flow, radial inflow vortex tube in which an oil-water mixture removed from the water surface at the site of an oil spill is pumped into the vortex tube at one end thereof at a very high flow rate so as to impart a strong swirl to the flow in the tube. In the preferred embodiment, a small circular core plate is positioned within an aperture at the center of the opposite end of the vortex tube from which the mixture enters. As the mixture swirls axially toward the opposite end wall, the difference in centrifugal forces due to density differences between the oil and water tends to accelerate the less dense oil radially inward to form a core region consisting almost entirely of oil. The flow in the core, largely oil, leaves the vortex separator through a port in the center of the wall at the end of the vortex separator at which the mixture was injected. The flow surrounding the core, almost entirely water, leaves through the annulus in the downstream end wall. The water is returned to the body of water from which the mixture was originally removed. The oil is stored.

In another embodiment of this invention, a tapered plug is positioned within the oil exit port, and the position of the tapered plug may be varied automatically or manually in response to the oil content of the incoming oil-water mixture, the water content of the exiting oil, or the size of the core of oil in the vortex separator, to vary the area of the oil exit port and control the oil flow exhausting from the vortex separator. A variable iris may be used in place of the tapered plug.

Numerous other embodiments and various details of the operation and construction of the novel vortex separator of this invention are shown in the accompany drawings.

DESCRIPTION OF THE PREFERRED EMBODIMENT

Of the numerous techniques proposed for cleaning up oil spills on the open ocean, physical removal of the oil from the surface appears to be the most desirable method. Surface skimmers may be used which rapidly pick up relatively large amounts of an oil-water mixture, consisting of approximately 0.1 to 10 percent oil. The oil is continuously separated from the water, and the oil-free water returned to the sea while the oil is stored. The critical component of the system is a high flow rate oil-water separator.

The use of a confined vortex flow is a very desirable method for separating the oil from the water. The vortex flow has the unique property of providing large relative radial accelerations between two components of differing specific gravities. Thus, the lighter oil is accelerated radially inward at a greater rate than the water. The oil is concentrated at the center of the vortex where it can be conveniently removed. The vortex separator is simple in construction, requires no rotation of a large mass such as in a centrifuge, and can handle large flow rates of an oil-water mixture in a small volume. However, a pressure drop across the vortex is a necessity, and a pump must be provided to increase the pressure of the incoming oil-water mixture.

Figure 1:
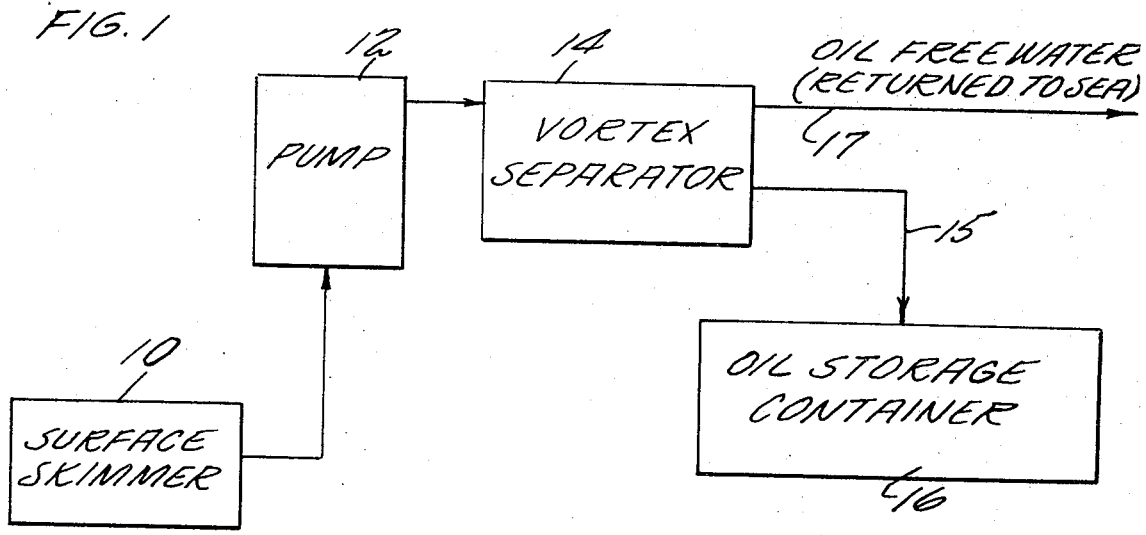
FIG. 1 shows in block diagram form a system for collecting an oil-water mixture from a body of water and separating the oil therefrom.

A block diagram showing the components necessary for an oil spill cleanup system employing a vortex separator is shown in FIG. 1. A surface skimmer 10 or other similar apparatus is required to pick up an oil-water mixture from the top surface of a body of water. The mixture is fed to a pump 12 from which the mixture is fed under pressure to a vortex separator 14 to be described in detail. The vortex separator separates the mixture into substantially pure oil which is fed through line 15 to an oil storage container 16, and substantially oil-free water which is returned to the original body of water via line 17. The entire system as shown in FIG. 1 may be incorporated to a high speed ship which may be rapidly deployed to an oil spill area, or the system may be assembled on a floating platform which may be rapidly transported via a large helicopter to the oil spill area.

The heart of the system is the vortex separator 14 which must provide for individual removal of both the oil and water. It is desirable to remove not only most or all of the oil injected into the vortex separator, but also to recover this oil in a relatively water-free condition so that the amount of storage necessary during an oil spill cleanup can be minimized.

Figure 2A:
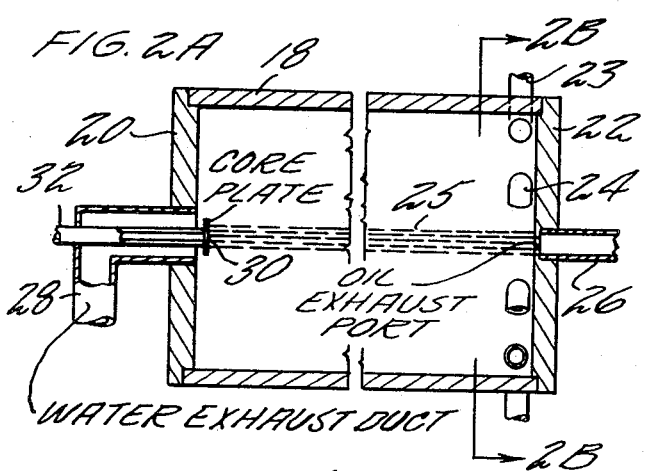
FIG. 2A is a section of a preferred vortex separator of this invention.
Figure 2B:
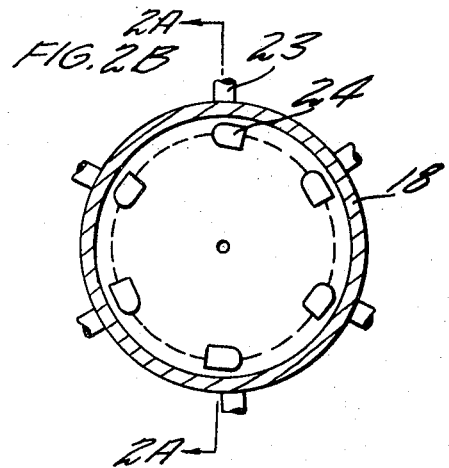
FIG. 2B is a section of the vortex separator shown at 2B—2B of FIG. 2A.

The basic vortex separator construction is shown in FIGS. 2A and 2B. The vortex separator consists of a cylindrical section 18 preferably constructed from a metal, but which may be fiber glass or plastic. The cylindrical section 18 is connected to end walls 20 and 22 generally formed from the same substance as section 18. A plurality of injectors 24 are located on end wall 22 of the vortex tube through which the oil-water mixture is injected into the tube in a tangential direction through one or more inlet ducts 23. The duct injectors 24 are located as near as possible to the peripheral wall 18 of the vortex tube. Six injection ducts 24 are shown, but this number may be varied depending on the size of the vortex tube, the capacity of the pump, etc. The mixture enters the vortex tube at a very high flow rate so as to impart a strong swirl to the flow in the tube. As the mixture swirls axially, the difference in centrifugal forces due to the density differences accelerates the less dense oil radially inward to form a core region 25 consisting of almost entirely of oil.

In the center of end wall 22 is an oil exhaust duct 26 through which the oil from the core region 25 is withdrawn from the vortex tube. The water is withdrawn from the vortex chamber through a duct 28 located at the end wall 20 opposite the end wall containing the injector ducts 24. A core plate 30 supported by a rod 32 is located on the vortex centerline and spaced a small distance into the vortex tube. The purpose of the core plate is to provide a space for the storage of the separated oil within the vortex chamber and prevent the oil from being swept out with the existing water. The core plate 30 may have an exit duct therein for the removal of oil, but it is preferred that the oil be removed through the exit duct 26 located at the center of the end wall containing the injectors.

Figure 3:
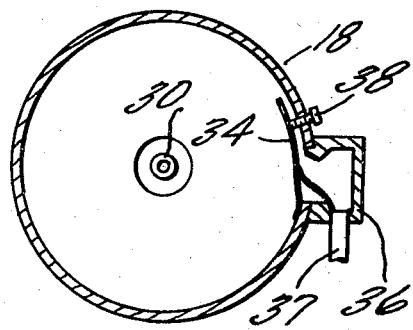
FIG. 3 is a section along the longitudinal axis of a vortex separator showing an alternate method of injecting the oil-water mixture.

FIG. 3 shows the vortex tube with a different water-oil mixture injection configuration. In FIG. 3, a thin plate 34 is connected to one wall 18 of the vortex chamber to which a U-shaped piece 36 has been attached. The plate 34 provides a slot on the peripheral wall of the vortex tube extending the entire length of the tube and allows a smooth entry into the vortex tube of the water-oil mixture in a tangential direction. The oil-water mixture is injected through input line 37 into chamber 39 formed by piece 36. The height of the injection slot may be varied by a screw adjustment 38 so that the injection velocity may be varied independently of the injected flow rate. In this embodiment the end walls are plain discs with ports at the center to provide for flow removal. A core plate is also preferred in the embodiment of FIG. 3.

Figure 4A:
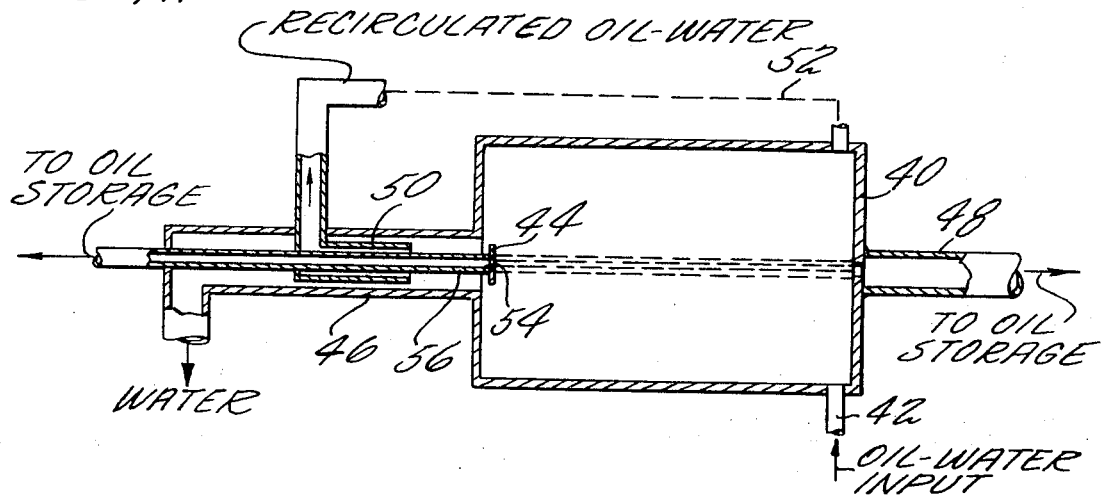
FIG. 4A shows schematically an embodiment of coannular flow removal ducts for the vortex separator.

Another embodiment of the vortex separator is shown in FIG. 4A. A standard vortex separator tube 40 is shown with the oil-water input being fed into the tube through a line 42. A core plate 44 as previously described is inserted at one end wall of the vortex separator tube through the exhaust duct 46. An oil exhaust line 48 is shown at the opposite end wall of the vortex separator tube.

An additional annulus 50 is inserted into the annular duct 46 and a portion of the water removed from the oil-water mixture within the vortex separator is recirculated through annulus 50 and fed back into the vortex separator through line 52 into an injector (not shown). It has been found that as the water exits past core plate 44 through annular duct 46, the portion of the water adjacent the outside walls of annular duct 46 may have a much lower oil content than that portion of the water toward the center of the annular duct. Consequently, operation of the system can be improved by recirculating the portion of the water with the higher oil content through annulus 50 and line 52 back into the vortex separator.

If the oil-water mixture in the vortex separator 40 has a very high oil content, it may also be advisable to exhaust the oil from both ends of the vortex separator. To that end, a port 54 is shown in core plate 44, and oil is fed therethrough and through line 56 to the oil storage area.

Figure 4B:
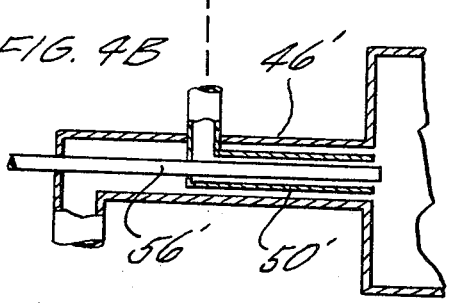
FIG. 4B shows schematically an alternate embodiment of coannular flow removal ducts.

If a core plate is not used, improved separator performance can be achieved using a triple coaxial exhaust flow as shown in FIG. 4B. The central duct 56' located on the vortex centerline would contain the oil exhaust flow. The outer annular duct 46' would contain the water exhaust flow, and the middle annulus 50' would contain oil-water mixture that would have a concentration of oil several times that being injected into the separator. This latter flow could be recirculated as shown in FIG. 4A.

Large radial accelerations between the oil and water exist in a vortex flow. To provide separation between the oil and water, the radial acceleration difference must exist for sufficient time to permit the oil to separate from the water. Performance of a vortex separator is adversely affected by low average residence times of fluids within the vortex separator. The minimum value of the average residence time which does not affect separator performance depends on the specific gravity of the oil. However, it can be generally stated based on experiments that an average residence time of 10 seconds or greater would provide sufficient time for separating the oil from the water. For oils with specific gravities less than approximately 0.9, the minimum average residence time for adequate vortex separator performance may be as low as 5 seconds.

The pressure drop across the vortex is independent of the vortex diameter but is dependent upon the tangential velocity of the oil-water mixture. Large radial accelerations of the oil particles can be obtained with pressure drops across the vortex generally less than 1.5 atmospheres.

The selection of average residence time permits the volume of the vortex separator to be related to the volume flow rate. In addition, a vortex separator with a length-to-diameter ratio of approximately 3 generally is desirable.

Another important parameter in the design of a specific vortex generator is the ratio $DL/A_j$, where D is the diameter of the vortex tube, L is the length of the vortex tube, and $A_j$ is the injection area for the oil-water mixture. It has been found that the ratio should not exceed approximately 50. This will then allow the ratio of the tangential velocity at the vortex peripheral wall to the injection velocity to be maintained between 0.7 and 0.9. If this ratio becomes too small, the radial acceleration of the oil will be decreased and oil separation will be difficult. However, $A_j$ cannot be made arbitrarily large since, for a given flow rate, the injection velocity is inversely proportional to $A_j$.

An additional important parameter in a vortex separator is a secondary flow parameter $B_t$. Secondary flow is the boundary layer flow on the end walls. A value of $B_t$ less than approximately 10 is necessary to insure a strong vortex and to insure that most of the flow does not enter the end wall boundary layers prior to exhausting the vortex tube. $B_t$ is given as:

$$D_t = (D/L) V_{\theta_1}^{0.8}/V_{r_1}$$

(1)

where (D/L) is the aspect ratio and $V_{\theta_1}$ and $V_{\Sigma_1}$ are the tangential and radial velocities respectively at the periphery of the vortex.

The tangential velocity and radial acceleration of the flow in a vortex decrease at radii less than that of the water exhaust radius. It is therefore desirable to maintain this radius of the water exhaust as small as possible. However, if large flow rates are desired, the water exhaust must be of sufficient size to prevent axial velocity in the exhaust ducts from becoming too large, thereby causing a large pressure loss. A water exhaust duct whose diameter is 0.2 times the vortex chamber diameter is a reasonable compromise which provides sufficiently large tangential velocities to permit oil separation while maintaining reasonable small axial velocities.

The design criteria enumerated above are based on maintaining the shear between the oil and water sufficiently small to prevent an emulsion from occurring in the vortex chamber.

The core plate diameter must be smaller than the water exhaust duct, and also must be larger than the oil exhaust port. A core plate whose diameter is 0.1 times the vortex tube diameter provides good performance. The axial location of the open plate should be at approximately the plane of the end wall, although it could protrude into the vortex about one or two percent of the axial length with no adverse affect on the separator performance.

The size of the oil exit port can have a major influence on the performance of the vortex separator since it depends upon the pressure drop across the oil exit hole that can be tolerated, the flow rate of oil that must be withdrawn, and the viscosity of the oil. Thus, it is desirable to employ an oil exit port whose diameter can be varied. Whether the diameter variation need to be made continuously or periodically will depend on the constancy of the oil-water mixture entering the vortex separator.

Figure 5:
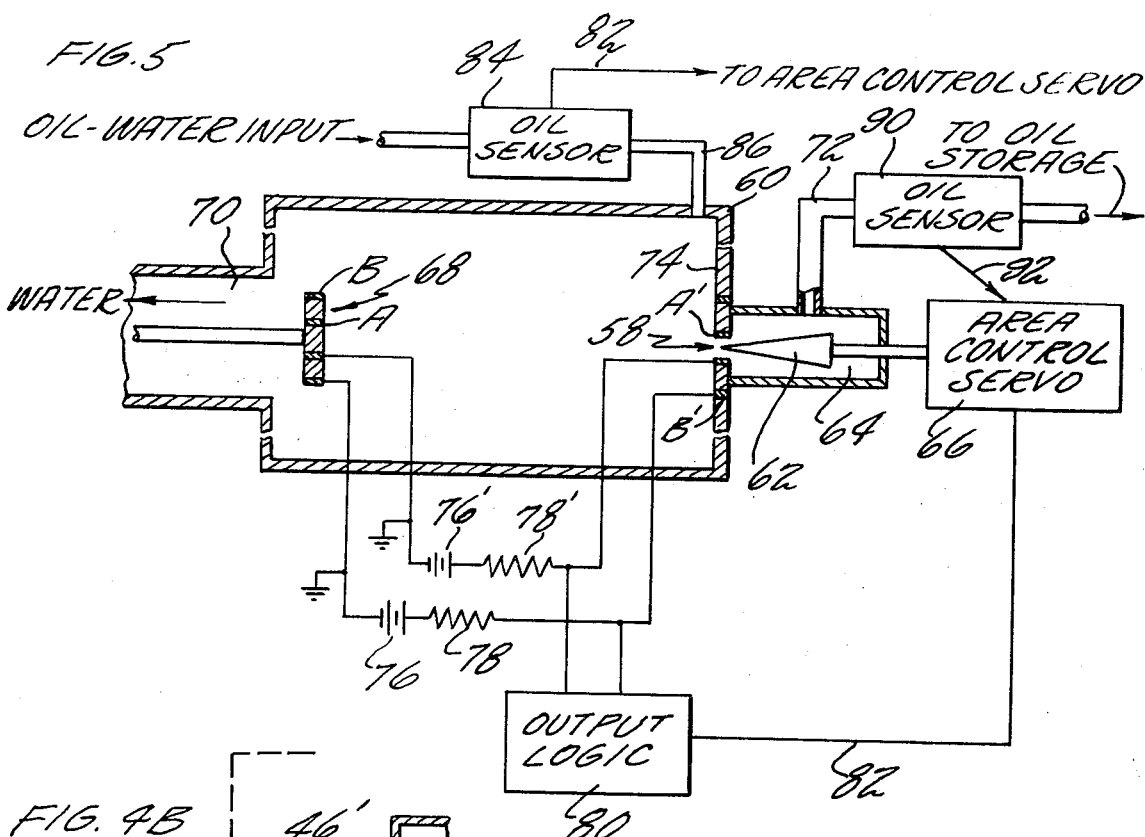
FIG. 5 is a schematic of a vortex separator having an automatically variable flow control valve.

FIG. 5 shows a means for controlling the oil exit port flow rate by changing the area of the oil exit port. The area of the oil exit port 58 in the vortex separator 60 is made variable by using a movable tapered plug 62 attached through a shaft 64 to an area control servo 66, the servo being responsive to various inputs, as will be described, to automatically regulate the position of the plug 62. A variable valve or iris may be preferred in some applications instead of a plug.

For a given condition and fixed vortex separator geometry, there is a maximum oil exit port flow rate. When the oil flow rate of the injected oil-water mixture is greater than this maximum, the oil core increases in size to a diameter greater than the diameter of the core plate 68, and oil is swept out through the water exit port 70. Thus, although the mixture exhausting through the oil exit port 58 and through line 72 to storage is almost all oil, the fraction of the injected oil captured by the vortex separator is decreased. When the oil flow rate of the injected oil-water mixture is less than this maximum, the oil core decreases in size to a diameter less than the diameter of the oil exit port. In this case, although the fraction of the injected oil captured by the separator remains high, the amount of water in the mixture exhausting through the oil exit port 58 increases.

Best performance of the separator occurs when both the fraction of injected oil that is captured and the fraction of oil in the mixture exhausting through the oil exit port are large. This best performance can be obtained over a range of oil-to-water ratios of the injected oil-water mixture by controlling the maximum flow rate through the oil exit port 58 and making this flow rate equal to the injected oil flow rate.

When the oil flow rate of the injected oil-water mixture is larger than the maximum flow rate through the oil exit port, the tapered plug 62 is moved to increase the area of the oil exit port 58. When the oil flow rate of the injected mixture is less than the maximum flow rate through the oil exit port, plug 62 is moved to decrease the area of the oil exit port. While movement of the plug 62 is shown in FIG. 5 to be automatically controlled by area control servo 66, manual portion of the plug can be accomplished such as by supporting the plug on a threaded shaft and rotating the shaft in a threaded hole, or a tight slip fit.

FIG. 5 also shows a means for automatically controlling the movement of tapered plug 62 by area control servo 66. Changes in the size of the oil core within the vortex separator are sensed and used to signal changes in the area of the oil exit port.

Referring to FIG. 5, the core plate 68 at the water exit end of the vortex tube and the end wall 74 at the injection end of the vortex tube are made from electrical insulating material. Both the core plate 68 and the end wall 74 contain two rings, A and B, and A' and B', made from electrical conducting materials. The small pair of electrode rings A and A' have a diameter slightly larger than that of the inside diameter of the oil exit port 58. The large pair of electrode rings B and B' have a diameter slightly less than that of the outside diameter of the core plate 68. Electrical connections are made to all four rings. The electrode rings A and B in the core plate are grounded, and rings A' and B' in the end wall 74 are maintained at a positive potential by means of batteries 76 and 76'. Because of the large difference in the electrical conductivity between sea water, highly conductive, and oil, low conductivity, a current flow in the circuit containing electrode rings B and B' will occur when the oil core diameter is less than the diameters of rings B and B', and current will flow in this circuit containing electrode rings A and A' when the oil core diameter is less than the diameters of rings A and A'. Resistors 78 and 78' produce a potential drop when current flows through the circuits. Output logic device 80 senses the presence or absence of voltage drops across resistors 78 and 78' and provides a signal to the area control servo 66 through line 82. When the oil core diameter is greater than that of electrode rings B, there is almost no current in either of the circuits. The absence of voltage drops across resistors 78 and 78' is sensed by output logic device 80 which results in a signal to the area control servo 66 to increase the oil port area. When the oil core diameter is greater than that of electrode rings A but less than that of electrode rings B, there is almost no current in circuit A and measurable current through circuit B. The presence of a voltage drop in circuit B and not in circuit A is sensed by output logic device 80 which produces a signal to area control servo 66 to maintain the oil port area at a constant value. When the oil core diameter is less than that of electrode rings A and B, there is a measurable current in both circuits A and B. This results in a signal from output logic device 80 to the area control servo 66 to decrease the oil port area. Thus, by controlling the oil port area and keeping the flow rate through the oil exit port equal to the injected oil flow rate, good performance can be provided by the vortex separator over a wide range of oil-to-water ratios of the injected oil-water mixture.

Information regarding the oil concentration in both the oil-water input to the vortex separator, and the oil output to the oil storage area, is also fed to area control servo 66 as shown in FIG. 5. An oil sensor 84 is positioned in the oil-water input line 86, and a signal indicative of oil content is fed through line 88 from the oil sensor 84 to the area control servo 66. An oil sensor 90 is positioned in exit line 72 through which the oil is fed from the vortex separator to the oil storage area, and a signal indicative of oil concentration is fed to area control servo 66 through line 92. The movement of the tapered plug 62 may thus also be regulated or controlled in response to the oil concentration in the input and output to the vortex separator. This control may be used either instead of or in addition to the conductive rings A and B shown also in FIG. 5. Furthermore, since a large water content is undesirable, controls may be affixed to the oil skimmer to change some geometric parameter to reduce the input water content.

Figure 6:
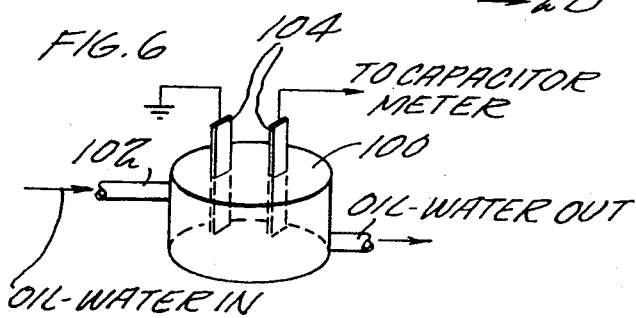
FIG. 6 shows a preferred oil content sensor used in FIG. 5.
Figure 7:
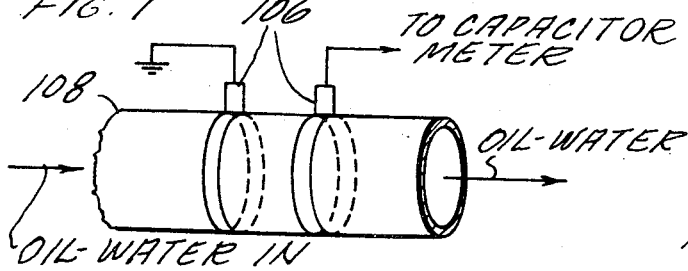
FIG. 7 is an alternate oil sensor.

Means for sensing the oil concentration are shown in FIGS. 6 and 7. Capacitance is used in conjunction with a standard capacitance meter to read oil concentration directly.

In FIG. 6, the oil-water mixture to be measured is fed into tank 100 through input line 102. Two parallel capacitor plates 104 are immersed in the oil-water mixture within tank 100. The capacitor plates which are metal must be covered with a thin layer of insulating material to prevent electrical current from flowing through the oil-water mixture. One of the metal plates is grounded, and the other plate is electrically connected to a standard capacitance meter such as a Tecktronic L-C meter.

In FIG. 7, the capacitor plates 106 are cylindrical and wrapped about the pipe 108 in which the oil-water mixture is flowing. As in FIG. 6, one of the metallic capacitor plates is grounded, while the other is connected to the capacitance meter similarly to the embodiment of FIG. 7.

The large difference in the dielectric constant between oil and water, the dielectric constant for water being approximately 80 while for oil it is about 3, will grossly alter the capacitance between the two metal plates. The capacitance between the plates will vary in an exponential manner with the concentration of water in the oil-water mixture. The arrangement of FIG. 6 has been found to be slightly more sensitive and more accurate than that of FIG. 7, although either device may be used.

For use in an ocean environment, vortex separators made from high grade stainless steel may be used. Tanks with anti-corrosive coatings are also desirable. Substantial weight reduction of the vortex separator could be realized by employing filament wound fiber glass reinforced plastic tanks.

While this invention has been disclosed in terms of preferred embodiments thereof, it is apparent that changes may be made in the precise construction and arrangement of parts without departing from the scope of the invention.

We claim:

1. A method for separating substantially pure oil from a mixture of oil and water comprising the steps of
injecting the oil-water mixture with a tangential component into a cylindrical chamber at or near one end wall thereof to cause said mixture to swirl axially about the axis of said chamber generating a vortex therein and producing a core consisting primarily of oil extending longitudinally along the chamber axis, said oil core being surrounded by a volume of water having a reduced oil content,
removing at least a portion of the core of oil from said chamber through a port located along the longitudinal axis of said chamber in the end wall adjacent the end at which said mixture is injected,
removing the water from said chamber through an annular aperture having a diameter about 0.2 times the diameter of the vortex chamber, said aperture being larger than the width of said oil removal port and located about the longitudinal axis of said chamber in the end wall opposite that at which said mixture is injected, and removing an additional portion of the oil from said chamber through a second port located along the longitudinal axis of said chamber in the same chamber end wall in which said annular aperture is located, said second port being concentric with and of lesser diameter than said annular aperture.

2. A method as in claim 1 and including the step of maintaining $B_t$ at a value less than 10, where $B_t = D/L \; (V_{\theta_1}^{0.8}/V_{r_1})$, and D is the diameter of the chamber,
L is the length of the chamber,
$V_{\theta_1}$ is the tangential velocity at the periphery of the vortex, and
$V_r$ is the radial velocity at the periphery of the vortex.

3. A method as in claim 1 and further including the step of recirculating through said chamber at least a portion of the water removed from said chamber through said annular aperture, said recirculated water being reinjected back into said chamber with the oil-water mixture.

4. A method as in claim 1 and including the step of separating the water removed from said chamber through said annular aperture into a component having a greater residual oil content and a component having a lesser residual oil content, and injecting the water component having a greater residual oil content back into said chamber with the oil-water mixture.

5. A method as in claim 1 and including the steps of sensing the diameter of the oil core within the separator, and adjusting the flow rate of oil through said first port to maintain the diameter of said oil core within preselected limits.

6. A method as in claim 1 and including the steps of sensing the oil content of the injected oil-water mixture, sensing the oil content of the oil passing through said first port, and adjusting the flow rate of the oil passing through said first port in response to said sensed oil content so that it is substantially equal to the injected oil flow rate.

7. Apparatus for separating substantially pure oil from a mixture of oil and water comprising a chamber having a cylindrical wall portion and a pair of opposite end walls, means for injecting an oil-water mixture having a tangential component into said chamber through duct means located at one end of said chamber, said mixture swirling axially within said chamber generating a vortex and producing a core region consisting primarily of oil extending longitudinally along the chamber axis, the oil core being surrounded by a volume of water having a reduced oil content, a first exhaust port for extracting at least a portion of the oil located along the chamber longitudinal axis at the center of the end wall at which said mixture is injected, an annular aperture for extracting said water located about the chamber longitudinal axis in the end wall opposite the first exhaust port, said aperture having a diameter about 0.2 times the diameter of the vortex in said chamber, said exhaust port having a lesser width than the diameter of said annular aperture, and a second exhaust port for extracting oil from said chamber located along the longitudinal axis of said chamber at the center of the end wall in which said annular aperture is located, said second port being concentric with and of smaller diameter than said annular aperture.

8. Apparatus as in claim 7 and including means for maintaining $B_t = D/L \; (V_{\phi_1}^{0.8}/V_{r_1})$, where D is the diameter and L is the length of the chamber and $V_{\phi_1}$ and $V_{r_1}$ are respectively the tangential and radial velocities at the periphery of the vortex, at a value less than ten.

9. Apparatus as in claim 7 and including means for maintaining the ratio $DL/A_j$, where D is the diameter and L is the length of the chamber, and $A_j$ is the area of the injecting means, at a value of 50 or below.

10. Apparatus as in claim 7 and including means for sensing the diameter of the oil core within said chamber, and means for varying the flow rate of oil through said first exhaust port to maintain the diameter of the said oil core within predetermined limits.

11. Apparatus as in claim 10 in which the flow rate varying means includes means for varying the area of the said first exhaust port.

12. Apparatus as in claim 10 in which said means for sensing the diameter of the oil core in said chamber and for varying the oil flow rate comprises a circular core plate of insulating material forming the center portion of the annular aperture through which the water is extracted, said core plate being smaller than the aperture and located with its center along the longitudinal axis of said chamber and approximately in the plane of the end wall in which said aperture is located, first and second concentric electrode rings mounted on said core plate, said first concentric ring having a diameter slightly larger than the diameter of the said first exhaust port, and the said second concentric ring having a diameter slightly less than the diameter of the said first exhaust port, third and fourth electrode rings mounted on the end wall containing said first exhaust port and electrically insulated therefrom, said third and fourth electrode rings having diameters equal to the diameters of said first and second electrode rings respectively, means for generating a potential difference between said first and third electrode rings and between said second and fourth electrode rings, current measuring means connected between said first and third electrode rings and between said second and fourth electrode rings, and means responsive to said current measuring means for selectively actuating said flow rate varying means.

13. Apparatus as in claim 11 in which said means for varying the area of said first exhaust port comprises a tapered plug positioned adjacent said first exhaust port with a portion of said plug extending within said port, and servo means for moving said tapered plug relative to said first exhaust port to vary the area of said exhaust port and regulate the flow of oil therethrough.

14. Apparatus as in claim 7 and including means for sensing the oil content of the injected oil-water mixture,
- means for sensing the oil content of the oil passing through said first exhaust port,
- and means responsive to said oil content sensing means for varying the area of said first exhaust port to adjust the flow rate of the oil passing through said first exhaust port to be approximately equal to the flow rate of oil in said mixture into said chamber.

15. Apparatus as in claim 7 in which said annular aperture includes a plurality of concentric ports with a plurality of exhaust ducts connected thereto,
- and means connecting one of said exhaust ducts to said injecting means to recirculate a portion of said water.

* * * * *